Nov. 16, 1965       H. M. JOHNSON       3,217,393
COPING GAUGE
Filed March 2, 1964                2 Sheets-Sheet 1
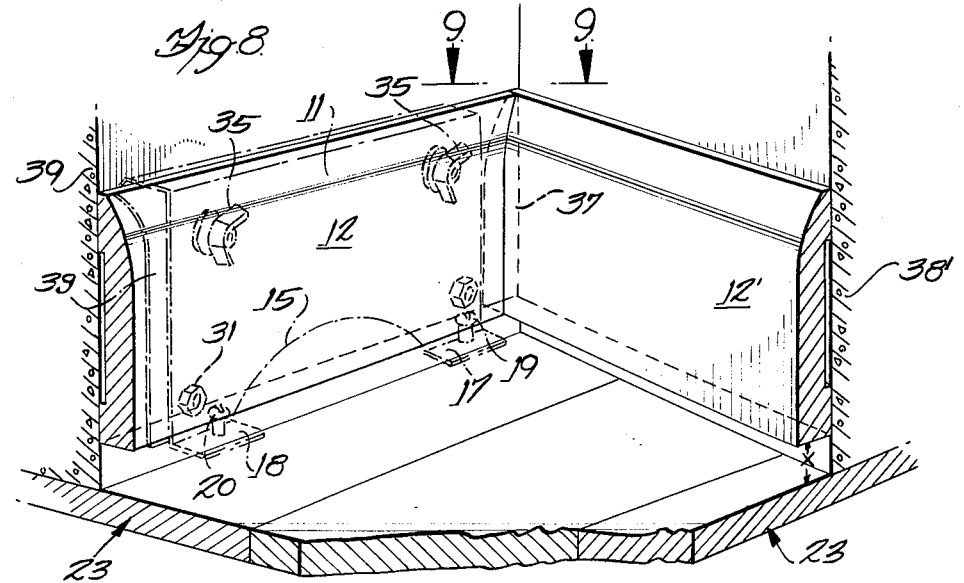
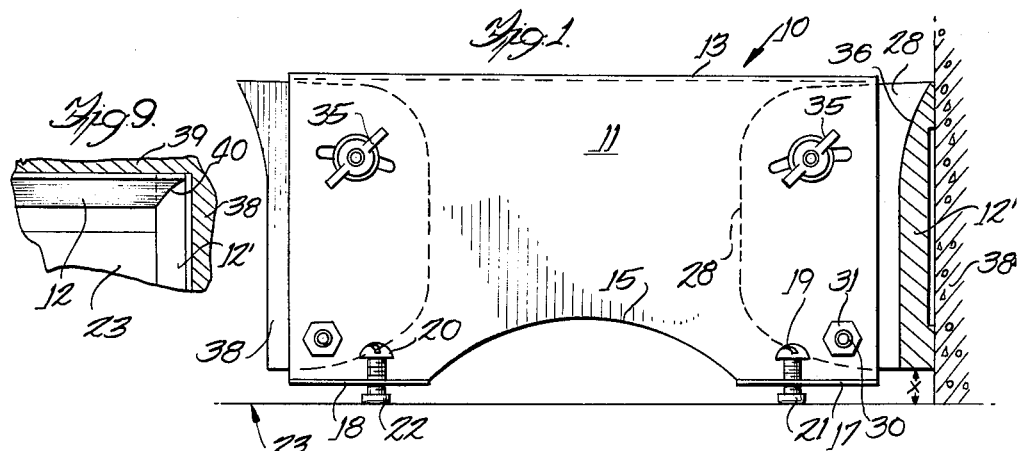
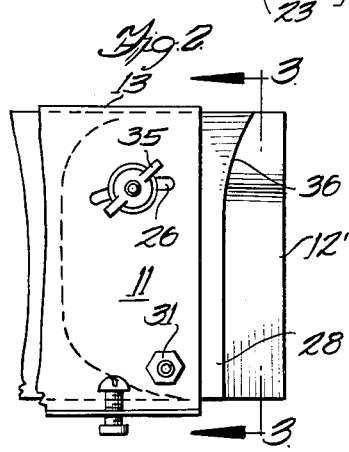
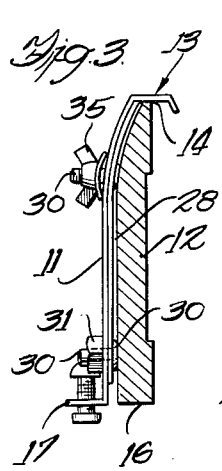
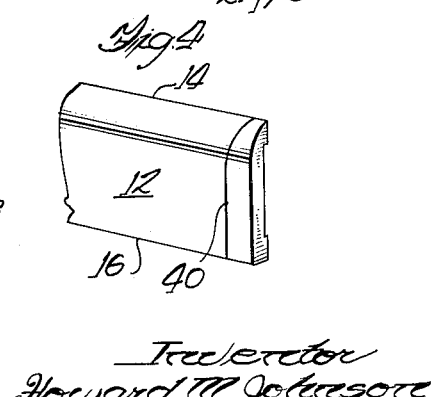
Inventor
Howard M. Johnson
Floyd B. Harman
Attorney

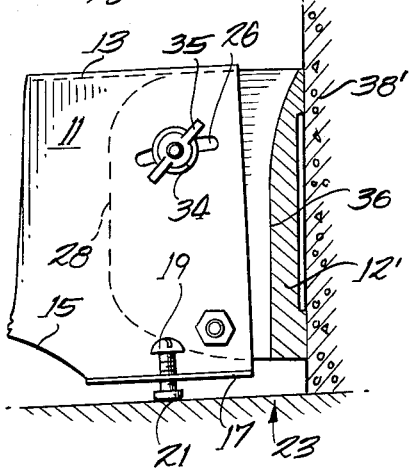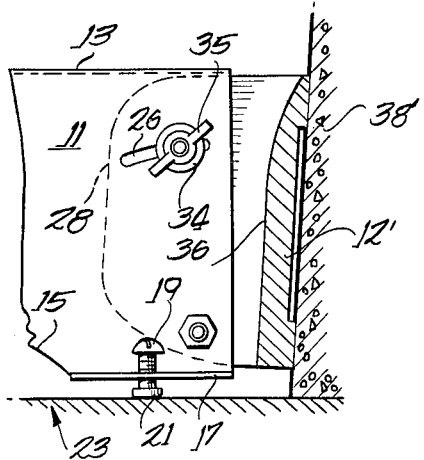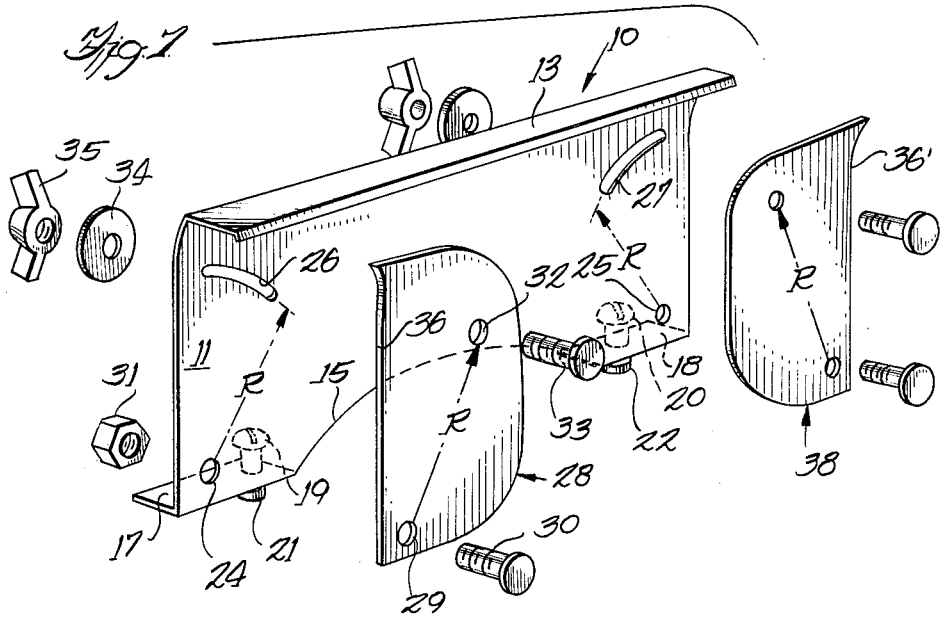

United States Patent Office 3,217,393
Patented Nov. 16, 1965

3,217,393
COPING GAUGE
Howard M. Johnson, Algonquin, Ill., assignor of two-thirds jointly to Bryan Coe, Jr., and Ann I. Coe
Filed Mar. 2, 1964, Ser. No. 348,715
6 Claims. (Cl. 33—174)

This invention relates to a gauge for use by craftsmen such as carpenters. More in particular this invention relates to a coping gauge for defing a border to be cut on a molding piece to fit tightly and accurately to another molding piece in inside corner relation.

In the construction of buildings a molding strip, usually of wood, is in most instances affixed to the walls of rooms adjacent to the floor. Sometimes the molding strip is affixed to the walls in spaced relation with respect to the floor for various reasons such as, for example, subsequent tiling of the floor or perhaps as a preparatory measure for subsequent installation of wall-to-wall carpeting. In other instances the molding strip is installed in abutting relation to the floor.

In the installation of such molding strips it is a customary practice of craftsmen to attempt to cut the strips at a 45° angle so that the junction of the strips at an inside corner fit tightly. However, any error the craftsman makes in such operation results in a poor fit leaving an open crack or crevice which is visible and thus unsatisfactory. Furthermore, if the two adjoining walls are out-of-plumb with respect to each other or the floor, it becomes exceedingly difficult for the craftsman to fit properly both molding strips together in inside corner relation. In order to offset these difficulties the craftsman will cut short length molding strips in inside corner relation to each corner and then employ one or more extension strips on a given wall to meet each other by cutting vertically. From this it will be apparent that the time required for even a good craftsman to install properly molding strips is great and thus costly. It is therefore a prime object of the present invention to provide a coping gauge which accurately defines the abutting border of the molding strip so that the craftsman can cut the strip with a coping saw or the like such that a proper inside corner fit invariably results.

Another important object of the invention is to provide a coping gauge which is quickly and conveniently adjustable to compensate for adjoining walls which are out-of-plumb so that the juncture of the molding strips will fit proper and tight.

Still another important object of the invention is to provide adjustable means for accurately controlling the spaced relation of the molding strips with respect to the floor even though the floor may be out-of-plumb with respect to the adjoining walls.

A yet further important object of the invention is to provide a coping gauge according to the preceding objects which is adapted for use in defining the border to be cut irrespective of whether the molding strips meets the inside corner of adjoining walls from the leftward side or the rightward side.

Another important object of the invention is to provide a coping gauge according to the preceding objects which can be used by a craftsman simply and efficiently to reduce the labor time required to install molding strips.

Still another object of the invention is to provide a coping gauge according to the preceding objects which is of relatively simple construction and low in cost.

These and other desirable and important objects inherent in and encompassed by the invention will be more readily understood from the ensuing description, the appended claims and the annexed drawings wherein:

FIGURE 1 is a front view of the coping gauge of this invention shown in engaging position with two adjoining walls, one wall having a mounted molding strip, and the adjoining floor;

FIGURE 2 is the rightward end portion view of the coping gauge of FIGURE 1, partly broken away, shown in position for scribing a molding piece for cutting preparatory to mounting on a wall;

FIGURE 3 is a section taken on line 3—3 of FIGURE 2 showing the relation between the coping gauge of this invention and a molding strip during use;

FIGURE 4 is a perspective view of a molding piece showing the scribe line defined by the coping gauge of this invention prior to cutting;

FIGURE 5 is the rightward end portion view of the coping gauge of the present invention showing application thereof where the floor is exaggeratedly shown to be sloped;

FIGURE 6 is similar to FIGURE 5 except that one wall is shown exaggeratedly out-of-plumb;

FIGURE 7 is a diagrammatic perspective view of the present invention in dis-assembled form;

FIGURE 8 is a perspective view, partly in section and partly broken away, wherein a first molding piece has been mounted to a first wall and a second molding piece is being gauged for cutting to fit in corner relation, the coping gauge of this invention, in phantom lines, positioned in gauging use; and FIGURE 9 is a plan view, partly in section and partly broken away, taken in the direction of line 9—9 of FIGURE 8, the tight fitting molding pieces resulting by means of the aid of the present invention.

Referring to the drawing in FIGURE 1 the numeral 10 indicates generally the coping gauge of this invention and is shown in dis-assembled form in FIGURE 7. The gauge 10 includes a body member 11 which in the preferred embodiment shown has a profile in general conformance with the curvature of the outer surface of the wood molding strip 12 as best seen in FIGURE 3. However, as will be evident later herein the cross-sectional configuration of the body member 11 need not be in conformance with the contour of the outer surface of the molding strip 12.

The upper portion of the body member 11 is provided with longitudinal inwardly extending guide 13 which serves to position the gauge 10 in longitudinal alinement with the upper edge or surface 14 of the molding strip 12 as evident from FIGURE 3. The lower portion of the body member 11 is provided with a cut-away portion 15 which for convenience permits the craftsman to grip the gauge 10 and at the same time urge the upper edge 14 of the molding strip 12 against the underside of the guide 13 by applying pressure from his fingers on the lower edge 16 of the molding piece 12.

The body member 11 is also provided with a pair of outwardly extending flanges 17 and 18. The flanges 17 and 18 are each provided with threaded bores for reception of adjusting screws 19 and 20 in threaded relation. The lower ends of the adjusting screws 19 and 20 are preferably provided with caps 21, 22 preferably made of a soft material such as plastic or rubber to prevent accidential marring of the floor 23. From the above it will be apparent that by adjusting the screws 19, 20 controls not only the alinement of the gauge 10 with respect to the upper surface of the floor 23 but also controls the vertical distance between the lower edge 16 of the molding piece 12 from the floor 23.

Disposed in the lower end portions of the body member 11 is a pair of transverse bores 24, 25 best seen in FIGURE 7. Also disposed in the body member 11 in radial distance R with respect to the bore 24 is an arcuate slot 26 extending transversely through the member 11 as shown in FIGURE 7. Likewise on the other end portion of the body member 11 in radial distance R with respect to bore 25 is a second arcuate slot 27 extending transversely through the member 11.

Adjacent the inner side of the body member is mounted a template member indicated at 28 in pivot relation with respect to the bore 24. The pivot connection between the template member 28 may conveniently be accomplished by providing the template with a transverse bore 29 (FIGURE 7), inserting a threaded stud 30 and welding both together in rigid relation. The threaded stud 30 fixed to the template 28 is inserted slidably through the bore 24 of the body member 11 and secured by the nut 31. Thus the template member 28 is secured to the body member 11 for pivotal movement about the axis of the bore 24.

In order to secure adjustably the template member 28 to the body member 11, the template member 28 is provided with an aperture 32 at radial distance R from bore 29. Within the bore 32 is inserted a threaded stud 33 which is secured to the template 28 rigidly as by welding. From this it will be apparent that the stud 33 extends through the arcuate slot 26 in register relation and thus the template 28 may pivotally move about the stud 30 limited by the arcuate slot 26. It will also be apparent that the template 28 may be releasably secured rigidly to the body member 11 by employing a friction device which as shown in FIGURE 7 may consist of a washer 34 and a wing nut 35 in thread-fit relation with the stud 33. Thus when the wing nut 35 is tightened on the stud 33 the washer 34 frictionally engages with the body member 11 to secure rigidly the template member 28 to the body member 11 in a predetermined angular relation limited by the arcuate slot 26. As will be evident later herein where the cross-sectional profile on the body member 11 does not conform to the contour of the outer surface of the molding piece 12 a sleeve spacer element (not shown) may be positioned on the stud 33 between the template member 28 and body member 11 so that tightening of the wing nut 35 does not result in deforming the template member 28.

From FIGURES 3 and 7 it will be seen that the profile of the template member 28 conforms closely with the configuration of the outer surface of the molding piece 12. In addition from FIGURES 1, 2, 5, 6 and 7 it will be seen that outer edge 36 of the template member 28 extending from the body member 11 conforms to the configuration of the outer surface of the molding piece 12 when the edge 36 is positioned normally or perpendicular with reference to the outer surface of the molding piece 12.

On the other end portion of the body member 11 is a second template indicated at 38 which is mounted on the body member 11 in the same manner as that described above for the template 28 and is adjustably secured thereto in like manner. However, it should be noted that configuration of the edge 36' and the cross-section profile of the template 38 is a mirror-image or symmetrical with respect to that of the template 28. The reason for the symmetrical construction of the template 38 with reference to template 28 is that the coping gauge 10 must necessarily be adapted for use in fitting molding strips from the leftward direction as well as the rightward direction.

For the foregoing it will be apparent that a craftsman requires but a single body member 11 but several pairs of template members 28 and 38 may be needed, one pair for each of various types of molding pieces differing from each other in the curvature or profile of the outer surfaces thereof.

In installing molding the craftsman first makes a conventional vertical cut 37 on a molding piece 12' at the end thereof and affixes it to the wall 38 as by nailing (FIGURE 8). If it is desired the molding piece 12' may be installed in spaced relation from the floor 23 by a predetermined distance designated as X in FIGURE 8. The craftsman then releases the friction device by loosening the wing-nut 35 thus permitting the template member 28 of the coping gauge to pivot freely with respect to the body member 11. Next the craftsman inserts into the gauge 10 a short length of scrap molding piece making certain that the upper edge 14 thereof is firmly against the guide 13, the assembly being held in one hand. The craftsman then places the gauge 10 with the inserted scrap molding piece against the wall 39 with the edge 36 of the template member 28 is abutting relation with the previously installed molding piece 12' as shown in FIGURE 1. He then adjusts the screws 19, 20 until the scrap molding piece is at the same height with respect to the floor 23 as determined by the distance X. Since at this time the template member 28 is freely pivoted about the stud 30 the edge 36 of the template member 28 will abut the outer surface of the molding piece 12' in tight fit relation as shown in FIGURES 1 and 2. Unless the clearance distance X is to be changed, the adjusting screws 19, 20 remain unchanged thereafter.

Next the craftsman tightens the wing-nut 35 thereby rigidly securing the template member 28 to the body member 11. The short length of scrap molding piece is removed and the molding piece 12 to be installed on the wall 39 is then inserted in the gauge 10 in the same manner and position of the short length scrap molding piece previously mentioned. The coping gauge 10 is then moved close to the rightward end of the molding piece 12. In this position the edge 36 of the template member 28 defines the border 40 (FIGURES 4, 8 and 9) for cutting the molding piece 12. The craftsman scribes a curved line along the edge 36 of template 28 on the molding piece 12 using a pencil or scribe. The gauge 10 is then removed from the molding piece 12 and the piece 12 is cut along the line or border 40 employing a conventional cutting device such as a coping saw. When the cut is completed the molding piece 12 will fit accurately in abutting relation to the previously installed molding piece 12' as illustrated in FIGURES 8 and 9. However, before nailing the molding piece 12 to the wall 39 the craftsman will cut the other end thereof by proceeding in the same manner as that above described except that the border on the other end will be defined by the edge 36' of the other template member 38. The entire length of the molding piece 12 can be indexed conveniently by conventional measurement so that the molding along a given wall may be of a single strip accurately cut by the aid of the coping gauge of this invention.

From the foregoing it will be readily appreciated that the invention enables a craftsman to fit molding pieces in inside corner relation precisely and rapidly as no estimating or guessing is required. It will also be observed from FIGURES 5 and 6 that where a wall such as wall 38' is constructed out-of-plumb or the floor 23 is sloped, the adjustable pivotal relation of the template member 28 with respect to the body 11 permits the coping gauge to compensate uniquely for such construction errors. Thus, despite such construction errors the craftsman by means of the present invention can rapidly install molding pieces in tight fitting inside corner relation without any estimating or guessing.

While molding pieces such as 12 and 12' are usually of wood construction it will readily be appreciated that the coping gauge 10 of this invention is applicable to molding pieces constructed of other materials such as plastic or metal. Furthermore, it will be apparent that where the cross-sectional configuration of molding is different than that shown in the drawing herein, a conforming pair of template members 28 and 38 may be substituted for that shown as the templates are removable from the body member 11.

Having thus described a preferred embodiment of the invention, it can now be seen that the objects of the inven- tion have been fully achieved and it must be understood that changes and modifications may be made which do not depart from the spirit of the invention nor from the scope thereof as defined in the appended claims.

What is claimed is:

1. For defining a border to be cut on the outer surface of a first molding piece positioned for mounting on a first wall to fit the outer contour of a second molding piece mounted on a second wall at a predetermined distance from an adjoining floor in inside corner relation: a coping gauge comprising a body member adapted to receive at least a portion of the outer surface of said first molding piece, said body member having a guide for positioning said first molding piece in longitudinal relation thereto, an adjustable indexing means mounted on said body member positioned to index the distance of said body member from said floor for positioning said first molding piece at said predetermined distance from said floor, an angularly adjustable template member mounted on one end portion of said body member and extending longitudinally therefrom, said template member having an outer edge conforming to the outer contour of said second molding piece when positioned in substantially normal relation to each other, said template member having a surface adjacent to said edge formed substantially in accordance with the contour of the outer surface of said first molding piece whereby said edge defines said border to be cut when said coping gauge is positioned in indexed relation with respect to said floor on said first molding piece.

2. A coping gauge according to claim 1 wherein releasable means are positioned on one of said members for adjustably securing said template member to said body member in rigid relation whereby said gauge is capable of orienting said template member with respect to said body member and said second molding piece for defining said border when at least one of said walls is out-of-plumb.

3. A coping gauge according to claim 2 wherein said template member is mounted in pivot relation to said body member, and said releasable means comprises a friction device positioned to secure said template member with said body member in rigid relation.

4. A coping gauge according to claim 3 wherein said releasable means comprises an arcuate slot disposed in one of said members, said arcuate slot being positioned in radial relation with respect to said pivot, an aperture disposed in the other of said members in register relation with said slot, and a releasable friction device extending through said aperture and said slot for adjustably securing said members in rigid relation.

5. A coping gauge according to claim 1 wherein said adjustable indexing means comprises a first element threadedly mounted on said body member adjacent one end thereof and a second element threadedly mounted on said body member adjacent to the other end thereof, said elements being adjustably positioned to engage said floor in abutting relation whereby said gauge is adjustably indexed with respect to said floor for positioning said first molding piece at said predetermined distance from said floor.

6. For defining a border to be cut on the outer surface of a first molding piece positioned for mounting on a first wall to fit the outer contour of a second molding piece mounted on a second wall in inside corner relation: a coping gauge comprising a body member adapted to receive at least a portion of the outer surface of said first molding piece, said body member having a guide for positioning said first molding piece in longitudinal relation thereto, a first template member pivot mounted on one end portion of said body member and extending longitudinally therefrom, said first template member having a first edge substantially conforming to the outer contour of said second molding piece when said second molding piece is positioned rightwardly of said first molding piece in substantially normal relation with respect to each other, a second template member pivot mounted on the other end portion of said body member and extending longitudinally therefrom, said second template member having a second edge substantially conforming to the outer contour of said second molding piece when said second molding piece is positioned leftwardly of said first molding piece in substantially normal relation with respect to each other, each of said template members having a surface adjacent to each respective edge formed substantially in accordance with the contour of the outer surface of said first molding piece, an arcuate slot disposed on each end portion of said body member, one of said arcuate slots being positioned in radial relation with said pivot on said one end of said body member, the other of said arcuate slots being positioned in radial relation with said pivot on said other end of said body member, an aperture disposed on each of said template members, each of said apertures being in register relation with an arcuate slot corresponding to the pivot mounting of each of said template members respectively, a releasable friction device extending through each arcuate slot and its registering aperture for adjustably securing each of said template members to said body member in rigid relation, and adjustable means disposed on said body member for adjustably indexing said body member in predetermined spaced relation with respect to a floor adjoining said walls.

References Cited by the Examiner

UNITED STATES PATENTS

| | | | |
|---|---|---|---|
| 697,090 | 4/1902 | Keef | 33—194 |
| 2,173,526 | 9/1939 | Adams | 33—75 |
| 2,873,534 | 2/1959 | Purviance | 33—174 |

ISAAC LISANN, *Primary Examiner.*

LEONARD FORMAN, *Examiner.*